March 22, 1955  H. F. HEIDEGGER  2,704,395
METHOD OF MANUFACTURING DRIVE UNITS
FOR INTERMITTENT MOVEMENTS
Original Filed July 8, 1948  3 Sheets-Sheet 1
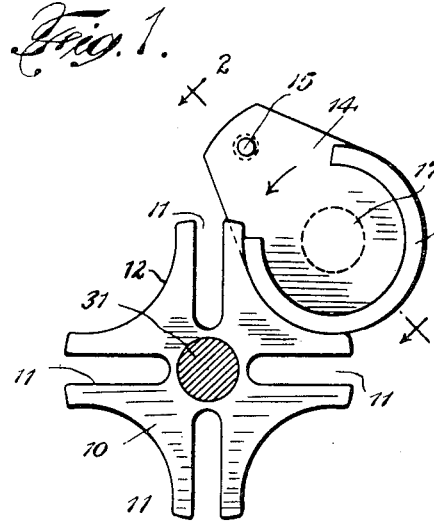
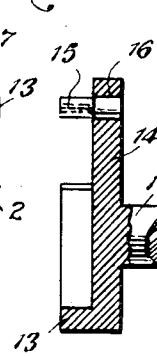
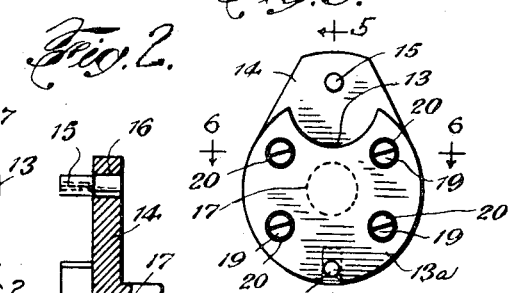
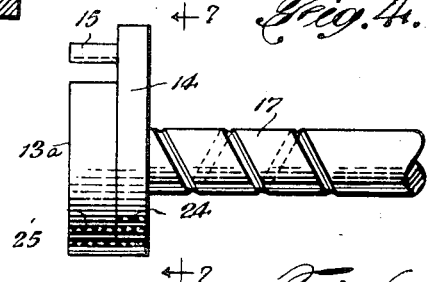
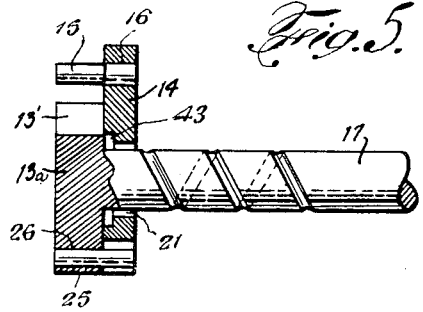
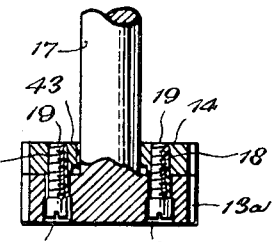
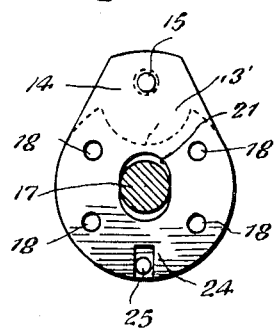
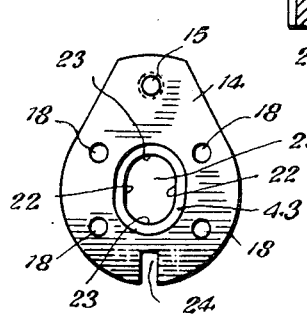
INVENTOR
Henry F. Heidegger
BY James B. Boyer
ATTORNEY March 22, 1955  H. F. HEIDEGGER  2,704,395
METHOD OF MANUFACTURING DRIVE UNITS
FOR INTERMITTENT MOVEMENTS
Original Filed July 8, 1948  3 Sheets-Sheet 2

INVENTOR
Henry F. Heidegger
BY James B. Boyer
ATTORNEY

March 22, 1955
H. F. HEIDEGGER
2,704,395
METHOD OF MANUFACTURING DRIVE UNITS
FOR INTERMITTENT MOVEMENTS
Original Filed July 8, 1948
3 Sheets-Sheet 3
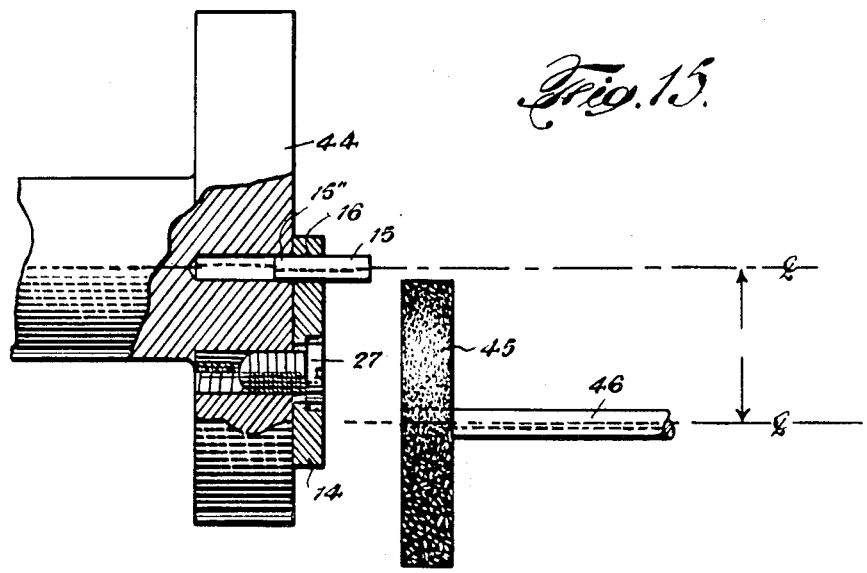
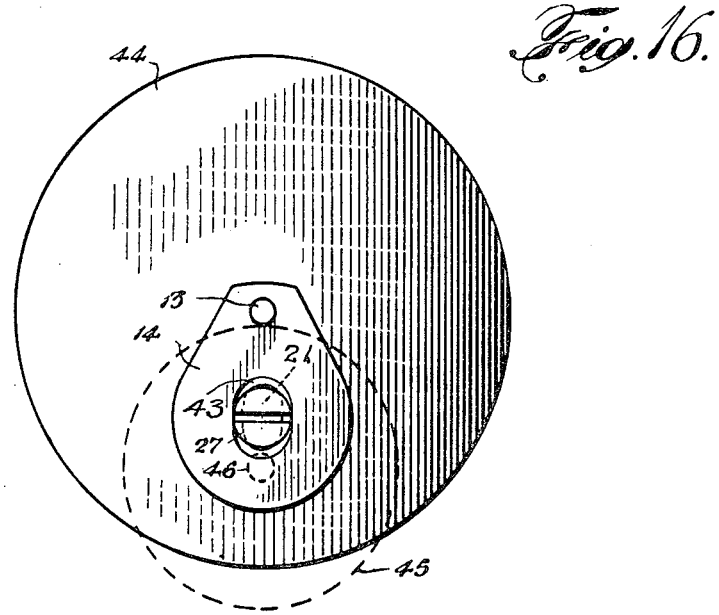
INVENTOR
Henry F. Heidegger
BY James B. Boyer
ATTORNEY

United States Patent Office 2,704,395
Patented Mar. 22, 1955

2,704,395

METHOD OF MANUFACTURING DRIVE UNITS FOR INTERMITTENT MOVEMENTS

Henry F. Heidegger, Glen Ridge, N. J., assignor to International Projector Corporation, Bloomfield, N. J., a corporation of Delaware Original application July 8, 1948, Serial No. 37,701, now Patent No. 2,607,236, dated August 19, 1952. Divided and this application December 5, 1951, Serial No. 259,974

3 Claims. (Cl. 29—428)

The present invention relates to motion picture projectors, and more especially to a method of making an element for an intermittent movement of the Geneva or Maltese cross type, which forms part of the intermittent film feed mechanism in a motion picture projector, this application being a divisional part of the parent application filed July 8, 1948, Serial No. 37,701, now Patent No. 2,607,236 issued August 19, 1952.

The invention particularly pertains to a novel and improved method of making a crank arm and pin unit which drives the star wheel of a Geneva movement, and to the method of constructing and assembling the same.

Heretofore, the cam or locking element which intermittently holds the star wheel and connected parts against rotation, has been formed integral with the crank arm and the crank shaft. As thus manufactured, a bar of solid stock of a diameter slightly larger in diameter and longer than the over-all length of the crank arm is placed in a lathe, and turned down to form a crank shaft of the required diameter at one end of which is a thick circular disc.

The part is then placed in a punch press and the disc sheared to approximately the size and shape of the crank arm. Thereafter, the outer face of the crank arm is milled out to form a cylindrical collar or locking cam cut away or mutilated at a point exactly in the same radius with the outer end of the crank arm and the axial center of the crank shaft, which arm likewise is milled down to the desired thickness. This collar or locking cam is of substantially the same cylindricity as the inner end of the crank arm, and is co-axial with, and partially encircles, the inner end of the crank shaft, which inner end, because of the milling of the collar, or locking element, may project centrally of the collar and be of the same height. It is wholly optional whether or not the end of the shaft projects centrally of the collar or locking cam. The entire area enclosed within the mutilated collar may be milled out if desired.

Milling out the excess material to form the collar or locking element reduces the weight of the part, but it is obvious that this milling operation may be confined merely to forming an arcuate recess in the disc in line with and adjacent the outer end of the crank arm, and reducing the thickness of the material forming the outer end of the crank arm sufficiently to afford room for its engagement and co-action with the radial slots of the star wheel constituting the driven member of the intermittent movement.

The part is now hardened, after which, the outer end of the crank arm is annealed and a seat or opening drilled therethrough into which one end of a hardened and finished wrist pin is press-fitted or driven.

The opening must be very accurately located with relation to its radial distance from the center of the crank shaft, and also with relation to the opposing cusps or ends of the mutilated collar or locking element, it being necessary to maintain a substantially equilateral triangular relation between the cusps and pin.

Also, it is imperative in an intermittent movement of this type, that the pin be of even diameter throughout its length, and that it lie exactly parallel with the shaft in both directions.

Yet notwithstanding the use of accurate jigs and fixtures, and the exercise of the greatest care in machining, the majority of the pins were out of parallelism with the crank shaft, there being insufficient room between the cusps of the mutilated collar and the pin to enable the pin to be ground evenly and to true it relatively to the crank shaft.

Because of the lack of room to use tools, it was customary to peen the pin from various angles to straighten it to its proper position, which operation was only partially effective and often resulted in loosening the pin in its seat, requiring the substitution of a new pin, all of which consumed time and labor, which increased the cost of manufacture.

One object of the present invention is to materially improve the crank arm and pin mounting of an intermittent movement.

Another object is to facilitate the method of manufacture of such units, with a consequent reduction in time and labor cost, and to insure more accurate machining of the parts.

My improved method wholly eliminates any necessity for peening the wrist pin after it is seated in the crank arm and after the parts are assembled.

To this and other ends, the crank arm may be blanked out of a metal sheet separately from the drive shaft and locking disc, which permits the finishing of the crank arm before it is assembled with the drive shaft and locking disc. An opening is formed through the crank arm near its inner end and after the wrist or drive pin has been machined or ground while firmly fixed in its seat in the outer end of the crank arm, the parts may be assembled by inserting the unobstructed end of the drive shaft through the opening in the crank arm, and the arm slid along the shaft until arrested by contact with the locking disc or cam on the shaft, to which disc the crank arm is suitably secured, as by threaded fastenings.

Or, as shown in the modified form, the drive shaft, locking cam and crank arm are all formed separately, which facilitates grinding the inner and outer faces of the locking cam and of the crank arm, to exact parallelism, and effects an economy in labor and metal, since a rod of approximately the desired diameter of the drive shaft can be turned down to size.

Thereafter, a reduced end of the shaft is press-fitted into a hole formed centrally of the locking cam until the shoulder at the juncture of the reduced end with the body of the drive shaft seats squarely against the inner face of the locking cam, and the wrist pin having been press-fitted into the aperture near the outer end of the crank arm and ground, the finished crank arm is slid onto the shaft, and rotated thereon until the mutually co-acting guide and locating means on the inner abutting faces of the locking cam and crank arm engage, after which the radial or longitudinal adjustment is made between the wrist pin and the clearance recess, and the crank arm and locking cam fastened together.

In either structure, the method of forming the crank arm is the same. The crank arm blank may be formed in a punch press from a plate of the required gauge or thickness, both side faces of the crank arm blank being ground parallel with each other and perpendicular to an opening formed through the blank, as more fully explained hereinafter.

An oversized driving pin is set in an opening drilled at a predetermined point in the outer annealed end of the crank arm blank, but the exact determination of this opening is not now as critical as heretofore, because of the provision for adjustability of the crank arm transversely of the shaft, which improvement constitutes a part of this invention.

While the crank arm and pin are yet disconnected from the shaft and locking disc, and hence, easily machined, the crank arm is placed in a surface grinder to finish the crank arm, and after the crank pin is seated in the arm, the crank arm and pin are mounted on a face plate or chuck in a special manner to enable the pin to be ground until it is exactly perpendicular with the parallel side faces of the crank arm, and of even cylindricity.

An arcuate recess is milled in the periphery of the locking disc to form a clearance, enabling the teeth of the star wheel to clear the locking disc as the star wheel is intermittently rotated by the crank arm and pin.

A further object of the invention is to provide means to hold the crank arm in exact angular relation to the crank shaft and yet permit adjustment of the crank arm radially of the shaft to properly locate the crank pin in accurate relation to the cusps of the arcuate recess in the cam or locking disc.

Other novel objects and advantages of this invention will be referred to in the following description and particularly pointed out in the claims.

In the accompanying drawings,

Fig. 1 is an end view of an old form of star wheel and crank arm;

Fig. 2 is a sectional view taken through line 2—2 of Fig. 1;

Fig. 3 is an end view of a preferred embodiment of the present invention, showing the two units of the crank arm assembled;

Fig. 4 is a side view of Fig. 3;

Fig. 5 is a sectional view taken on line 5—5 of Fig. 3;

Fig. 6 is a sectional view taken on the line 6—6 of Fig. 3;

Fig. 7 is a sectional view taken on the line 7—7 of Fig. 4;

Fig. 8 is a detail view of the inner face of the crank arm, showing the driving pin and crank arm removed from the crank shaft and locking disc;

Fig. 15 is a diagrammatic view in side elevation of the novel method of grinding the wrist or crank pin; and Fig. 16 is a detail face view of the crank arm attached to the face plate of a grinding lathe.

Figure 9:
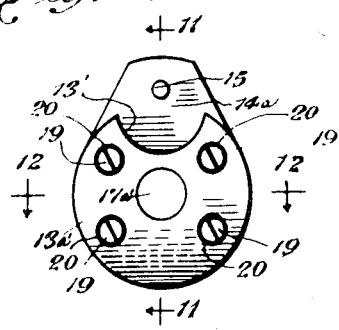
Fig. 9 is an end view of a slightly modified form of crank arm.
Figure 10:
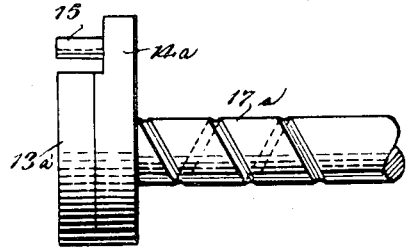
Fig. 10 is a side view of the modification shown in Fig. 9.

In motion picture projecting machines it is customary to place a supply reel of film on a spindle, the leading end of the film being then threaded through and over and under various appurtenances, and past the projection aperture, thence beneath and partially around an intermittent or pull-down sprocket fast on a driven shaft 31 (Fig. 1), after which the film is led eventually to a suitable take-up reel.

The driven shaft 31 is intermittently turned step-by-step through arcs of equal angularity alternating with dwell periods during which dwell periods the picture images are projected onto the screen.

All the foregoing being old and well known practice in the art to which no claim is made, no illustration is deemed necessary.

One well known method of imparting the necessarily accurate intermittent pull down movements to the intermittent sprocket is by a Geneva movement, which must operate smoothly, evenly and quietly, and the present invention is directed to the improvement of such an intermittent movement and to the method by which it is manufactured.

With reference to Figs. 1 and 2 of the drawings, showing a previous form of Geneva or intermittent movement on which my invention is an improvement, a star wheel 10 fast on the driven shaft 31, is provided with the usual radial slots 11 engageable by a wrist or drive pin 15 mounted near the free end of a crank arm 14 fast on a driving crank shaft 17.

In such previous form a mutilated locking cam 13 resembling an open cylindrical collar is formed on the outer side face thereof, and integral and co-axial with, the crank arm 14, to co-act with the equidistantly spaced concave recesses or dwells 12 alternating with the radial slots 11 of the star wheel, to lock the star wheel against rotation during its dwell or rest periods.

The wrist or drive pin 15 is press-fitted into an opening 16 (Fig. 2) drilled near the free or outer end of the crank arm 14, and in this old form the distance between the axial centers of the pin 15 and the crank shaft 17 should be held to a tolerance of one ten-thousandth of an inch to insure that, as the crank arm rotates in the direction of the arrow, Fig. 1, the wrist pin 15 shall exactly register with the open ends of the radial slots 11 in the star wheel 10 and easily slide therein without binding as it turns the star wheel to impart a full 90 degree arc of rotation to the star wheel during a complete rotation of the crank arm.

Likewise, it is essential that the wrist pin 15 be in exact parallelism with the crank shaft 17 which is very difficult to attain, in commercial practice, when the crank arm and locking collar are integral, since there is no room to use the proper grinding means to true the wrist pin. For instance, a grinding stone rotates at high speed, and a stone small enough to grind the pin in such constricted space would wear away or erode so rapidly that the pin would not be ground perfectly cylindrical, nor would it be parallel with the crank shaft in both directions. As a result, much hand work and extreme care were required to straighten the pin to the proper position.

Furthermore, the work of turning down a solid piece of bar stock to form a crank shaft with a thickened circular disc on one end, shearing the disc in a punch press to form a crank arm, milling out the disc to form a cylindrical, open, locking cam, as well as reducing the thickness of the crank arm, and then grinding the part to scale, involved considerable time and labor and was wasteful of material.

The present invention avoids the foregoing objections by forming the crank arm 14 separately from the crank shaft 17 and locking disc 13, as shown in Figs. 5 and 6.

This apparently simple change leads to the elimination of the disadvantages inherent in the former structure, and provides advantages not present in former structures.

Figure 11:
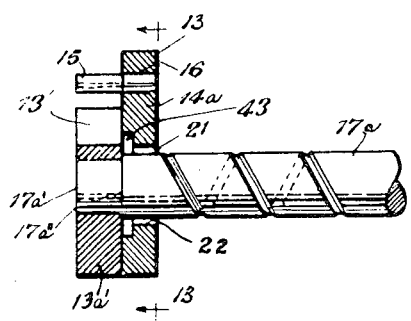
Fig. 11 is a sectional view taken on the line 11—11 of Fig. 9.
Figure 12:
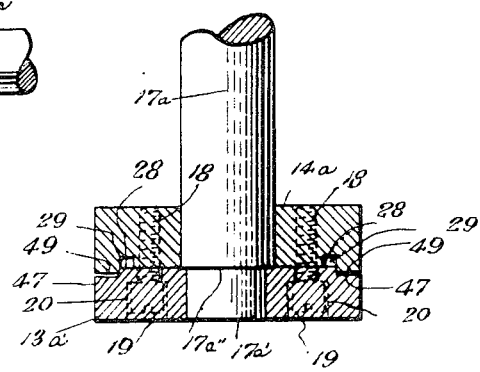
Fig. 12 is a sectional view taken on the line 12—12 of Fig. 9.
Figure 13:
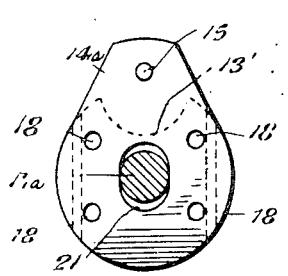
Fig. 13 is a sectional view taken on the line 13—13 of Fig. 11.
Figure 14:
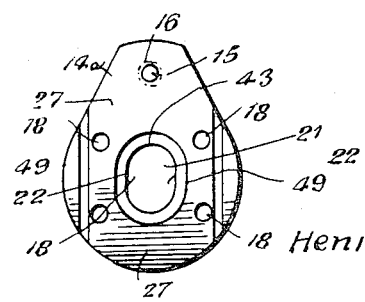
Fig. 14 is a detail front view of the inner face of the modified form of crank arm shown in Fig. 12.

The crank shaft 17 and locking disc 13a' may be formed integrally of one piece of stock, or separately, as desired. If made separately, the locking disc 13a' is securely fastened to the outer end of the crank shaft 17a by press-fitting one end 17a' of the crank shaft into a slightly smaller hole formed in the exact center of the locking disc, as shown in Fig. 11.

However, in the form shown in Figs. 4 to 6, the crank shaft and locking disc are formed of a single piece of bar stock which is placed in a lathe and turned to the proper dimensions, a slight countersink being formed, if necessary, at the juncture of the shaft 17 and disc 13a to remove the fillet. The shaft and disc are hardened and then ground to the exact size required.

During the grinding operation, both the inner and outer faces of the locking disc 13a are ground absolutely parallel with each other and with the diameter of the disc so as to be perpendicular to the longitudinal axis of the crank shaft.

Prior to the grinding operation, an arcuate clearance recess 13' of proper size is milled in the periphery of the locking disc 13a and a plurality of relatively spaced, unthreaded holes 20, Figs. 3 and 6, counterbored on the outer face of the locking disc, are drilled transversely through the locking disc to accommodate the means for fastening the crank arm 14 (now formed separately) to the locking disc, as will be more fully explained hereinafter.

Subsequently to the grinding operation, a locating and guide stud 25 is press-fitted into a hole 26, Fig. 5, previously drilled through the locking disc 13a at a point diametrically in line with the axial center of the crank shaft and the deepest point of the arcuate clearance recess 13' in the periphery of the locking disc, as seen in Fig. 3. The locating stud 25 projects some distance beyond the inner face of the locking disc 13a, for co-action with the crank arm 14 in a manner and for a purpose hereinafter explained.

Forming the crank arm 14 separately from the locking disc 13a enables the production of a much more accurately dimensioned and readily machined locking disc with a material saving in time and labor.

And fully as much improvement is effected in the ease and accuracy with which the separate crank arm may now be manufactured. Thus, the crank arm blank (Figs. 3–8) is now perfectly flat, unencumbered by the locking cam or disc, the blank being punched from a plate, in a die press, to approximate dimensions, after which a slotted opening 21 (Figs. 5, 7 and 8) is formed centrally through the blank, said opening being slightly elongated in the direction of the long diameter of the blank which constitutes the major axis of the slot, said slot 21 having parallel sides, as at 22, Fig. 8, the ends 23 of the elongated slot or opening being rounded to conform to the periphery of the crank shaft 17 on which the crank arm 14 is to be mounted.

Being perfectly flat on both sides, the crank arm is now held in the magnetic chuck of a surface grinder to enable both sides of the crank arm to be easily and quickly ground parallel with each other and perpendicular to the longitudinal axis of the crank shaft, whereby the inner ground faces of the locking disc 13a and crank arm 14, respectively when assembled, will maintain a close fitting contact.

A small opening 16 (Fig. 5) corresponding with the opening 16 in the old form of intermittent movement shown in Figs. 1 and 2, is formed near the free end of the crank arm 14 and in line with the longitudinal axis of the slot or opening 21 into which opening is press-fitted a wrist pin 15 of slightly larger diameter.

The location of the opening 16 is important and the parallelism of the wrist pin and crank shaft when the parts are assembled, is very important to enable the smooth steady engagement and disengagement of the wrist pin 15 relatively to the slots 11 in the star wheel.

To obtain this parallel relation of the wrist pin and crank shaft, the inner face of the crank arm 14 has been counterbored, as at 43, Fig. 8, around the elongated slot or opening 21, to a depth slightly greater than the thickness of the thin head of a screw 27 (see Figs. 15 and 16). Thus equipped, the crank arm is secured by the screw to the face plate 44 of a grinding lathe or machine, the head of the screw 27 lying in the counterbore 43 below the outer face of the crank arm 14, out of the way of the grinding wheel or tool 45. The crank arm is so located on the face plate 44 that the unfinished wrist pin 15 press-fitted into the hole 16 (Figs. 5 and 15), lies exactly in line with the axis of rotation of the face plate of the grinding lathe. The rear end of the wrist pin may extend slightly beyond the rear face of the crank arm, as a teat 15", to enter the usual hollow center of the face plate and thus afford a centering gage for the wrist pin.

By thus fastening the crank arm to the face plate, the wrist pin will be rotated on its own axis as the face plate rotates.

The grinding wheel or tool 45, Fig. 15, mounted on a rotating shaft 46 arranged parallel with the axis of rotation of the face plate 44, is caused to traverse the wrist pin from its outer end to the face of the crank arm during the rotation of the face plate and crank arm which results in forming a perfectly cylindrical wrist pin as the latter turns on its own longitudinal axis, so that the pin is absolutely parallel with the crank shaft 17 when the crank arm is assembled therewith. This result is assured since the faces of the face plate 44 and the crank arm are perpendicular to the grinding wheel shaft 46, and the screw 27 is parallel with the grinding wheel shaft.

Incidentally, the teat 15" is ground off after the wrist pin has been ground to scale.

The wrist pin 15 near the outer end of the crank arm must be so located as to be equidistant from the cusps or edges of the arcuate clearance recess 13' and in triangular relation with said edges. Also the wrist pin seat 16 must lie in line with the major diameter of the elongated slot 21 and of the crank arm, but the location of these critical points is much more readily determined by my invention than in the prior structure on which my invention is an improvement.

Returning now to the embodiment of Figs. 3–8, it will be recalled that a locating and guide stud 25 projects from the inner face of the locking cam or disc 13a at a point near the periphery of the disc.

To effect the proper adjustment or location of the wrist pin 15 relatively to the edges of the clearance recess 13', a slit 24, Figs. 3, 7 and 8, is cut in the rounded periphery or heel at the inner end of the crank arm 14, the slit lying in line with the longer diameter of the centrally located elongated opening 21 in the crank arm 14 so as to register with the locating stud 25.

This slit 24 is just wide enough to accommodate the locating stud 25 projecting from the inner face of the locking disc 13a, with sufficient clearance only to enable the crank arm 14 to slide relatively to the stud. The crank arm, due to the engagement of the guide slit and pin, is adjustable in a straight line only, transversely of the crank shaft a slight distance permitted by the length of the elongated opening or slot 21, the crank arm being rotatable on the crank shaft to bring the slit 24 into registry with the locating stud 25, after which the crank is slid axially against the inner face of the locking disc 13a so that the walls of the slit embrace the locating pin to prevent rotation of the crank arm on its shaft.

In assembling the parts, the unobstructed end of the crank shaft 17 is inserted through the centrally located slot 21 of the crank arm 14 from the inner face of the crank arm, which arm is then slid along the shaft and, if necessary, turned thereon, to align the locating slit 24 with the locating pin 25 projecting from the inner face of the locking disc 13A. When the locating slit and its pin are aligned, the crank arm is slid axially against the locking disc to bring the parallel inner faces of the crank arm and locking disc into close contact or abutment, during which operation the locating stud 25 is embraced by the walls of the locating slit 24. Fastening means, as fillister-headed screws 19 are then inserted, as seen in Fig. 6, through the unthreaded counterbored holes 20 of the locking disc, the threaded ends of the fastening means being screwed into threaded or tapped holes 18 formed through the inner end of the crank arm 14 to register with the counterbored holes 20 of the locking disc. The counterbored holes 20 are slightly larger in diameter than the tapped holes 18 in the crank arm to enable such slight relative adjustment of the crank arm and locking disc as may be required. The screws 19 are not turned down tightly at this time, their present purpose being merely to hold the crank arm in close relation to the locking disc during the process of adjusting the crank arm relatively to the locking disc.

This adjustment is readily effected by gently tapping the crank arm 14 at its inner or outer ends along its major axis until the wrist pin 15 lies in proper relation with the edges of the arcuate clearance recess 13', the locating pin 25 and slit 24 preventing any turning movement of the crank arm on the crank shaft during such adjustment. The locating slit 24 is of sufficient length to permit the required adjustment of the crank arm 14 relatively to the locking disc 13a, and still prevent rotation of the crank arm.

After the crank arm and locking disc are in proper adjustment, the headed screws 19 are turned down tightly to preserve the adjustment, the square shoulders of the heads of the screws bearing against the square shoulders formed by counterboring the holes 20, to squeeze the parallel inner faces of the crank arm and locking disc tightly together which occasions a frictional adherence of the inner faces.

This arrangement provides a still further advantage not present in the former structure on which my invention is an improvement, in that, in case of the breakage of the wrist pin 15, for instance, the crank arm 14 can be removed and a new one substituted, already equipped with a properly ground wrist pin which will be parallel with the crank shaft when the new crank arm is assembled therewith. Thus, there is provided an interchangeability of parts.

Also, it will be apparent that the provision of a crank arm and pin bodily adjustable relatively to the crank or drive shaft affords a means for insuring that the wrist or drive pin shall impart a substantially exact 90 degree movement to the star wheel, not only for the purpose of accurately feeding or "pulling down" the film a distance which shall displace one picture image from register with the projection aperture and bring the succeeding picture image or frame into exact register with the projection aperture, but also to simultaneously advance the slotted projections of the star wheel then engaged by the pin a sufficient distance beyond the trailing edge or cusp of the clearance recess 13' to prevent collision therewith.

Of course, the seating of the cam disc 13a in the dwell of the star wheel may be relied upon to rectify any minor inequality in the pull down feed, but adjustment of the crank arm and pin, by lengthening or shortening the duration of engagement of the pin and star wheel, permits some slight variation of the throw imparted by the pin to the star wheel.

The modification illustrated in Figs. 9 to 14 differs from the form shown in Figs. 3 to 8 in details of construction only.

Thus, referring to Figs. 9 to 12 particularly, it will be seen that the locking disc 13a' and crank shaft 17a are formed separately to illustrate the alternative method of construction hereinbefore mentioned. A reduced end 17a' of the crank shaft 17a is press-fitted into a hole of slightly smaller diameter drilled exactly centrally of the locking disc 13a', the juncture of the reduced end 17a' and the crank shaft 17a forming a square shoulder 17a'' abutting the flat inner face of the locking disc around the hole to fit squarely against the inner face of the locking disc, so that the shaft and locking disc will be perpendicular to each other.

The circular locking disc 13a' is peripherally recessed at 13', as in the form shown in Figs. 3 to 7, to provide clearance for the teeth of the star wheel 10, as it is advanced step by step, but unlike the form shown in Figs. 3 to 7, the locking disc of the alternative form is not equipped with a locating stud. Instead, two diametrically opposite sides or segments of the inner face of the locking disc are milled off or reduced in height, as at 47 (Fig. 12) to leave between them a centrally disposed table or raised portion 28 having two sides which are in exact parallelism with each other and also parallel with a line diametrically intersecting the deepest point in the clearance recess 13' and the axial center of the crank shaft 17a. This raised table 28 formed on the inner face of the locking disc serves as a guide for the crank arm 14a and its wrist pin 15 in their adjustment transversely of the crank shaft.

The crank arm 14a of the modification, like the crank arm of the form of my invention first described, is provided with a centrally disposed slot or elongated opening 21 having straight parallel sides, and rounded ends, the longitudinal diameter of the slot being in line with a crank pin seat 16 formed near the outer free end of the crank arm. However, the inner face (Figs. 12 and 14) of the crank arm 14a is milled out from end to end to form a shallow centrally and longitudinally extending trough 27 flanked on opposite sides by clearance grooves 29 slightly deeper than the longitudinally extending trough 27, leaving unreduced diametrically opposed segmental areas or ways 49 complementary and of similar shape, to the segmental, reduced areas 47 of the locking disc 13a'. The width of the trough or channel 27 formed in the inner face of the crank arm added to the widths of the respective grooves 29 on opposite sides of the trough is just sufficient to enable the ways 49 to embrace the guide table or rail 28 formed on and extending diametrically of the inner face of the locking disc 13a'.

The wrist pin 15 is press-fitted into the seat 16 near the outer end of the crank arm 14a, the inner and outer faces of the crank arm being ground as heretofore explained in reference to the form of my invention shown in Figs. 3 to 8. The provision of the clearance grooves 29, in the inner face of the crank arm enables the bottom of the trough 27 on the inner face of the crank arm to be ground parallel with the outer face of the crank arm without leaving fillets along the side edges of the trough, the grooves also enabling the side walls of the trough to be ground parallel with each other to a point below the bottom of the trough. The faces of the segmental ways 49 are also ground to a horizontal plane, and the crank or wrist pin 15 is ground to a true cylinder and to parallelism with the crank shaft 17 in the same manner as heretofore explained; a counterbore 43 being formed around the edge of the slot 21 in the inner face of the crank arm to accommodate a screw, as heretofore explained.

In assembling the parts, the reduced end 17a' of the crank shaft 17a is first press-fitted into the hole centrally located in the locking disc 13a'; the opposite end of the shaft is then inserted through the slot 21 from the inner face of the crank arm, which arm is slid along the shaft toward the locking disc, the arm being turned on the shaft, if necessary, to register the trough or reduced portion 27 on the inner face of the crank arm with the raised table or guide 28 on the inner face of the locking disc, after which the arm is fitted to the locking disc with the bottom of the trough 27 in contact with the raised table or guide, and the segmental ways 49 of the crank arm embracing the straight parallel sides of the raised table or guide, the horizontal faces of the segmental ways 49 bearing against the complementary horizontal reduced faces 47 on opposite sides of the raised table or guide 28.

The co-action of the guide table 28 with the ways 49 prevents rotary movement of the crank arm, but permits a sliding adjustment of the crank arm transversely of the shaft to enable the wrist pin 15 to be properly located relatively to the edges of the clearance recess 13', as in the form of invention shown in Figs. 3 to 8.

Upon obtaining the proper adjustment, the crank arm 14a is secured to the locking disc 13a', preferably by the fastening means 19 accommodated in counterbored oversized holes 20 extending through the locking disc, and threading into holes tapped in the inner face of the crank arm, as explained in connection with the first form of invention.

Changes and alterations may be made in the form and arrangement of the several parts described without departing from the spirit and scope of the invention as set forth in the following claims.

What I claim as new is:

1. The method of truing the wrist pins of crank arms for driving the star wheels of Geneva movements, comprising forming an aperture in the crank arm blank to accommodate the drive shaft on which the crank arm will eventually be mounted; drilling a pin seat through the crank arm blank near its outer end; securing a wrist pin in the seat in substantially transverse relation to the crank arm; attaching one face of the blank to a rotatable face plate in parallel with the face plate so that the laterally projecting wrist pin extends outwardly from the face plate and in coincidence with the axial center of rotation of the face plate; and grinding the outwardly projecting pin to cylindricity and to exact perpendicular relation to the faces of the crank arm blank while the crank arm blank is attached to the face plate, and during rotation of the face plate and crank arm.

2. The method of accurately truing wrist pins of crank arms for driving the star wheels of Geneva movement; comprising grinding the side faces of the crank arm blank to parallelism; forming an aperture in the hub of the crank arm blank to accommodate the drive shaft on which the crank arm will eventually be mounted; drilling a pin seat transversely through the crank arm blank near its outer end; securing a wrist pin of excess length in the seat in substantially transverse relation to the crank arm blank, so that the rear end of the wrist pin projects outwardly beyond the seat; attaching the crank arm to a rotatable face plate having a hole centered on its axis of rotation very substantially the same size as the rearwardly extending end of the wrist pin, with one of the parallel faces of the crank arm blank in contact with the outer face of the face plate, so that the laterally projecting body of the wrist pin extends outwardly relatively to the face plate, with the rearwardly extending end of the pin in the central hole of the face plate to serve as a gauge to locate the outwardly projecting body portion of the wrist pin in the exact axial center of rotation of the face plate; and grinding the outwardly projecting body portion of the wrist pin to cylindricity and to exact perpendicular relation with the parallel faces of the crank arm while the blank remains attached to the rotating face plate.

3. The method of accurately truing wrist pins of crank arms for driving the star wheels of Geneva movement; comprising grinding the side faces of the crank arm blank to parallelism; forming an aperture in the hub of the crank arm blank to accomodate the drive shaft on which the crank arm will eventually be mounted; drilling a pin seat transversely through the crank arm blank near its outer end; securing a wrist pin of excess length in the seat in substantially transverse relation to the crank arm blank, so that the rear end of the wrist pin projects rearwardly beyond the seat; attaching the crank arm to a rotatable face plate having a hole centered on its axis of rotation very substantially the same size as the rearwardly extending end of the wrist pin, with one of the parallel faces of the crank arm blank in contact with the outer face of the face plate, so that the laterally projecting body of the wrist pin extends outwardly relatively to the face plate, with the rearwardly extending end of the pin in the central hole of the face plate to serve as a gauge to locate the outwardly projecting body portion of the wrist pin in the exact axial center of rotation of the face plate; and grinding the outwardly projecting body portion of the wrist pin to cylindricity and to exact perpendicular rotation with the parallel faces of the crank arm blank while the blank remains attached to the rotating face plate; disengaging the crank arm blank from the face plate; and removing the rearwardly-projecting locating end of the wrist pin.

References Cited in the file of this patent

UNITED STATES PATENTS

| | | |
|---|---|---|
| 1,251,907 | Moyer | Jan. 1, 1918 |
| 1,938,203 | Witherell | Dec. 5, 1933 |
| 2,119,334 | Leffler | May 31, 1938 |
| 2,276,050 | Leighton | Mar. 10, 1942 |
| 2,350,827 | Saulnier | June 6, 1944 |
| 2,369,043 | Halford | Feb. 6, 1945 |
| 2,570,765 | Cerf, Jr. | Oct. 9, 1951 |
| 2,607,236 | Heidegger | Aug. 19, 1952 |